July 26, 1932.     E. V. WILBERN     1,868,554

GUARD AND TRAP

Filed July 16, 1930

Inventor

Edward V. Wilbern,

By

Attorney

Patented July 26, 1932

1,868,554

UNITED STATES PATENT OFFICE

EDWARD V. WILBERN, OF SAUGERTIES-ON-THE-HUDSON, NEW YORK

GUARD AND TRAP

Application filed July 16, 1930. Serial No. 468,396.

In the production of cocoanuts, great trouble is experienced by reason of rats climbing the trees and destroying the partially formed or half ripe cocoanuts. As a consequence it has been the practice to place guards on the trees which will prevent the ascension of the rodents to the nuts.

One of the objects of the present invention is to provide means by which the rodents which attempt to ascend the trees, are captured and preferably destroyed, thereby not only preventing destruction of the fruit, but securing the destruction of the animal that causes the damage.

While the invention is particularly designed for cocoanut trees, it is obvious that it may be employed on trees of other characters which may be subject to the same trouble and indeed on posts or supports for corn cribs, granaries and the like.

The structure shown is on a tree, indicated at 4, it being readily understood that this may be a support of any kind, such as a post or standard on which a granary, bin or corn crib is mounted. Encircling the tree is a bell-shaped rodent guard that may be variously constructed. In the present instance it is formed of sheet metal sections 5 having outstanding flanges 6 that are bolted or otherwise secured together, as shown at 7. The upper end, which is of least diameter, snugly encircles the tree trunk and is thereby supported on said trunk. This leaves an open space 8 within the same and around the trunk, the space tapering toward the top, as shown particularly in Figure 3. A guard of this kind is ordinarily sufficient to prevent the ascension of the rodents, which rodents, however, can descend and escape.

Figure 1:
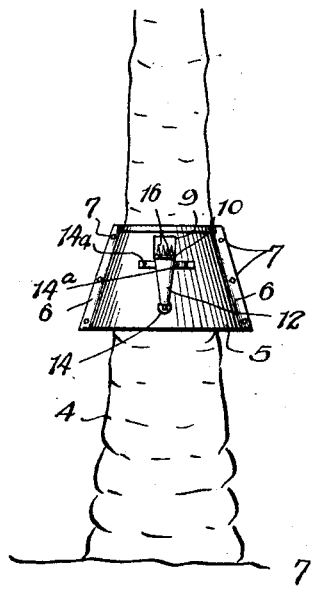
Figure 1 is a side elevation of one embodiment the invention may take, and showing it on a tree with the trap set.
Figure 2:
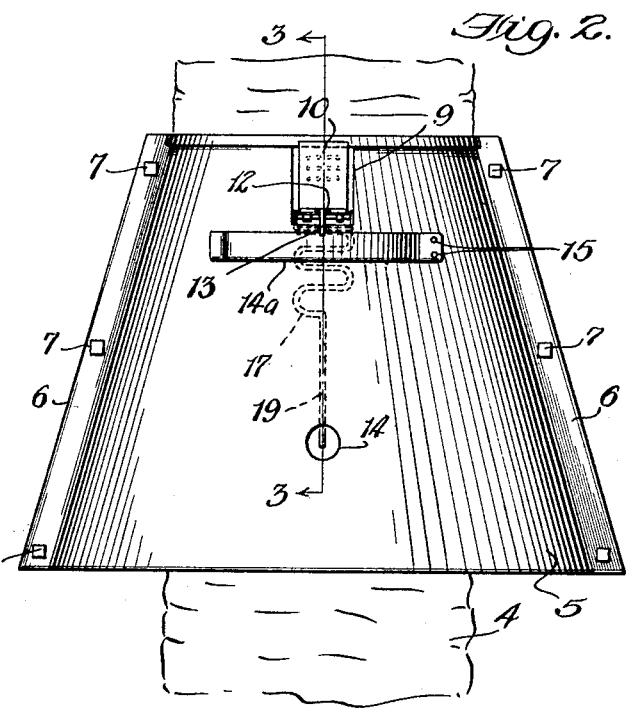
Figure 2 is an enlarged view of the same, with the trap sprung.
Figure 3:
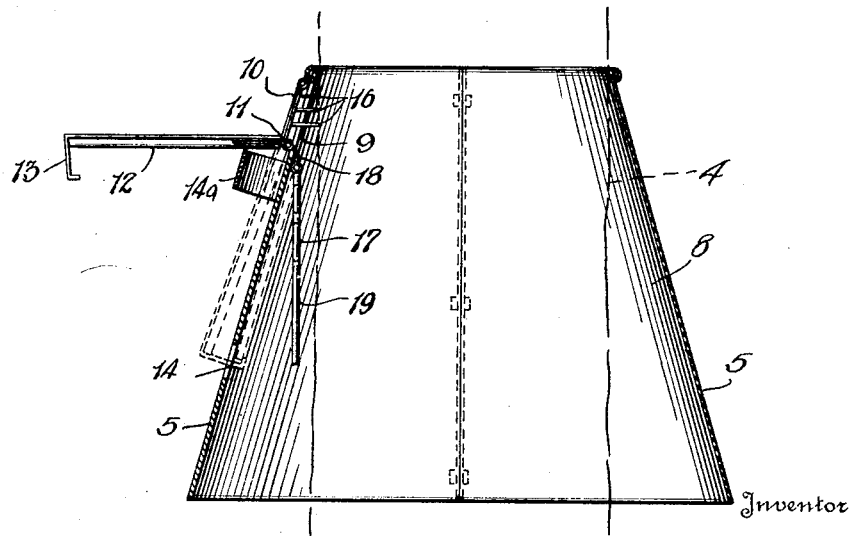
Figure 3 is a sectional view on the line 3—3 of Figure 2.

In the present embodiment, there is formed in the wall at the upper portion of the guard, an opening 9 of sufficient size to permit an animal ascending the trunk, to pass therethrough, or at least partially pass therethrough. This passageway therefore will be found by an animal attempting to make the ascension as it circles around the trunk in the space 8. Associated with this passageway 9 is a trap mechanism. In the embodiment disclosed, it consists of a jaw plate 10 pivoted at 11 to the guard at the lower end of the opening or passageway 9 and adapted to swing upwardly across the same, as indicated in Figures 2 and 3. The jaw has an angularly disposed finger 12 fixed thereto at its lower end, said finger terminating at its free end in an inset hook 13 that is adapted to pass through a relatively small opening 14 in the wall below the passageway 9. A leaf spring 14a, secured at one end, as shown at 15, operates against the underside of the finger 12 and thus serves to swing said finger outwardly and swing the jaw 10 across the passageway 9. The jaw is provided with a plurality of spikes or spurs 16 that enter the passageway.

In order to secure the jaw in its outermost position and with the finger 12 lying alongside the outer face of the guard a trigger is employed, consisting of a wire or rod having a serpentine portion 17 pivoted to a a link 18 that is engaged with the pivot 11 of the jaw. The lower end of this trigger is a straight piece 19 that is adapted to lie longitudinally along the inner side of the guard and engage the hook 13, as indicated in dotted lines in Figure 3.

The operation of the device is as follows: The jaw is set with the spring 14a compressed by having the hook engaged with the portion 19 of the trigger. The jaw is thus swung outwardly away from the opening or passageway 9. When a rodent ascends the tree and enters the space 8, it moves about the trunk in an endeavor to find a passageway on up the trunk, and consequently discovers the opening 9. In endeavoring to pass through this opening, it will rub against the serpentine portion 17 of the trigger and jostle it sufficiently to release the hook 13. The spring 14a thereupon is free to act, swinging the finger 12 outwardly and the jaw 10 inwardly, causing the spikes 16 to pass into the opening 9 and spear the animal.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. The combination with a guard for encircling a tree or like support to prevent the ascension of rodents, said guard having a passageway for the rodents, of a rodent trapping jaw for engaging a rodent passing through said passageway, and means for holding and tripping the jaw.

2. The combination with a guard for encircling a tree or like support to prevent the ascension of rodents, said guard having a passageway for the rodents, of a rodent trapping jaw having impaling means that operate in passageway, and means for holding and tripping the jaw.

3. The combination with a substantially bell-shaped rodent baffle having means for securing its smaller end in a position encircling a tree or like support, said baffle having a passageway for the rodents through its wall and opening into the space within the bell and about the tree or support, of a trap mechanism for engaging a rodent passing through said passageway.

4. The combination with a substantially bell-shaped rodent baffle having means for securing its smaller end in a position encircling a tree or like support, said baffle having a passageway for the rodents through its wall and opening into the space within the bell and about the tree or support, of a trap jaw mounted on the bell and operating on an animal entering the passageway, and trigger mechanism for the jaw located within the bell.

5. The combination with a substantially bell-shaped rodent baffle having means for securing its smaller end in a position encircling a tree or like support, said baffle having a passageway for the rodents through its wall and opening into the space within the bell and about the tree or support, of a trap jaw pivoted on the bell and operating in the passageway, a spring for operating the jaw, and a latch for holding the jaw against the action of the spring and including a trigger on the inside of the bell adjacent the passageway.

6. The combination with a substantially bell-shaped rodent baffle having means for securing its smaller end in a position encircling a tree or like support, said baffle having a passageway for the rodents through its wall and opening into the space within the bell and about the tree or support, of a trap jaw pivoted on the outside of the bell and having spike teeth that enter the passageway, said jaw having a finger provided with an offset hook at its free end, a spring operating against the finger to move the jaw, and a trigger mounted on the inner side of the bell and having a portion that detachably engages the hook.

In testimony whereof, I affix my signature.

EDWARD V. WILBERN.